Oct. 16, 1962 R. L. SMITH 3,058,309
HYDRAULIC BRAKE SYSTEM
Filed May 15, 1961

INVENTOR
Ross L. Smith

United States Patent Office 3,058,309
Patented Oct. 16, 1962

3,058,309
HYDRAULIC BRAKE SYSTEM
Ross L. Smith, Richmond Hill, Ontario, Canada, (% Canadian Research & Development Foundation, 1434 Queen St. W., Toronto 3, Ontario, Canada)
Filed May 15, 1961, Ser. No. 109,957
6 Claims. (Cl. 60—54.6)

This invention relates to improvements in hydraulic braking systems, and more particularly, to improvements in hydraulic braking systems for motor vehicles, principally automobiles, buses, transport vehicles and the like.

It is conventional practice to utilize hydraulic braking systems consisting of a master cylinder, mechanically connected to a brake pedal within the vehicle. Upon the brake pedal being depressed a piston within the master cylinder applies pressure to the fluid within the system, which is distributed through suitable tubing and flexible connections to the wheel cylinders. These wheel cylinders operate the wheel braking mechanism.

The above system has the disadvantage that all the wheel cylinders are connected to a common hydraulic circuit so that a fluid leak from any component within the circuit inevitably leads to total brake failure. Other types of conventional systems adapted to overcome this disadvantage utilize two or more separate master cylinders and systems operated from a single pedal, one system supplying braking action to the front wheels and a separate system supplying braking action to the rear wheels of the vehicle. Such systems have the disadvantage that in the event of a fluid leak there is no immediate indication of brake failure, the brake pedal action not being affected. Furthermore, these systems are more difficult to adjust than the standard system to obtain an even braking action, and an added disadvantage lies in the fact that in doubling the number of components, they become considerably more costly both to manufacture and operate.

External devices have been developed to equalize pressure within each of the systems described in the event of failure of any one of them. These devices, however, are both complicated and costly, and furthermore, are prone to mechanical failure.

It is an object of this invention to provide a safety brake master cylinder, in the following called master cylinder, that will permit a portion of the braking system to remain operative in the event of a failure of any one part of the vehicle's braking system.

It is another object of this invention to provide a master cylinder, that will indicate to the driver of the vehicle that a partial failure of the braking system has occurred.

It is further an object of this invention to provide a master cylinder that will operate two separate braking systems, having one system connected to the front wheels, the other to the rear wheels, without increasing the number of components over that of a conventional system.

It is further an object of this invention to provide a master cylinder which, under normal conditions, will operate as a conventional master cylinder.

It is yet another object of this invention to provide a master cylinder which will permit a standard type brake adjustment to be carried out.

It is still another object of this invention to provide a master cylinder which, in the event of failure occurring in one section of the braking system, will immediately isolate the defective sections and continue to provide braking action through the remaining section.

It is still another object of this invention to provide a brake fluid reservoir so partitioned that the supply of fluid to each cylinder is separate, yet permits both compartments to be filled through one filler hole, thereby reducing the entry of foreign matter into the braking system, through not requiring to remove two or more filler caps.

It is still another object of this invention to provide a master cylinder which may be used singly or in combination with other units, as for example, on tractor trailer units and the like.

It is a further object of this invention to provide a master cylinder that will automatically indicate the failure of one section of the braking system.

It is still another object of this invention to provide a master cylinder that will indicate to the driver of the vehicle by an automatically operable device the necessity for mechanical repairs or adjustment to the braking system of the vehicle, well in advance of a brake failure.

It is a further object of this invention to provide a master cylinder which, as an added safety feature to reassure correct operation upon being repaired after brake system failure, will have incorporated therein a manual reset device.

These and other objects and features of this invention will become apparent when taken in conjunction with the accompanying drawings in which.

Figure 1:
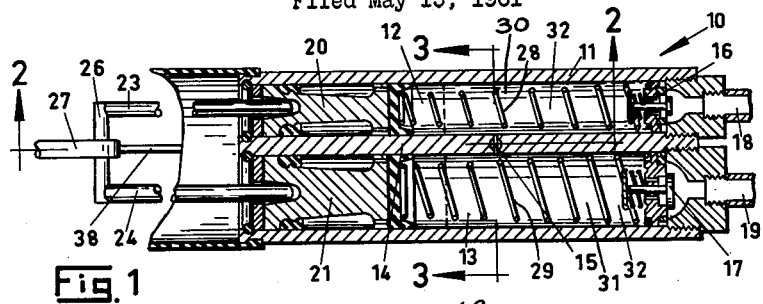
FIG. 1 is a longitudinal, mid-vertical section of a brake master cylinder embodying this invention illustrating the general lay-out of components.

Referring to FIG. 1, a master cylinder indicated generally by arrow 10 comprises a housing 11 in which two longitudinal cylinders 12 and 13 are formed. A centre diaphragm 14 is adapted to separate cylinders 12 and 13 and to act as a portion of the walls thereof.

An interconnecting port 15 located substantially midway between the ends of cylinders 12 and 13 is adapted to form an interconnection therebetween.

Two conventional check valve units 16 and 17 are located at one end of cylinders 12 and 13 respectively, valves 16 and 17 being adapted to communicate the interiors of cylinders 12 and 13 with two hydraulic pipe lines 18 and 19 respectively.

Two conventional pressure pistons 20 and 21 are slidably located within cylinders 12 and 13 respectively and are operated therein by means of two piston rods 23 and 24 respectively. Rods 23 and 24 are interconnected at their outer ends by a rod 26 rigidly connected thereto. An operating rod 27 extends outwardly of rod 26 and is attached to a conventional brake pedal located in the vehicle for the operation, through rod 26 and rods 23 and 24 of pistons 20 and 21 within cylinders 12 and 13 respectively.

Conventional helical springs 28 and 29 are located within cylinders 12 and 13 respectively and extend between the inner surfaces of pistons 20 and 21 and in the inner surfaces of check valve units 16 and 17 respectively.

The spaces 30 and 31 within cylinders 12 and 13 defined by the inner surfaces of pistons 20 and 21 and the inner surfaces of valves 16 and 17 respectively are filled with hydraulic fluid 32 which also passes through check valves 16 and 17 into pipe lines 18 and 19 respectively.

It should be noted that cylinder 12 and its associated mechanism is of smaller diameter than cylinder 13, cylinder 12 being adapted to supply hydraulic fluid through pipe line 18 to the rear brakes of the vehicle and cylinder 13 through pipe line 19 to the front brakes of the vehicle, the normal difference in capacity thereof necessitating the difference in bore sizes of cylinders 12 and 13.

It should be noted that pistons 20 and 21 are rigidly interconnected and move simultaneously within their respective cylinders 12 and 13.

Port 15, as previously described, is adapted to interconnect spaces 30 and 31 of cylinders 12 and 13 so that, in normal operation, pressures within fluid medium 32 are equalized throughout the whole of the hydraulic system.

Figure 2:
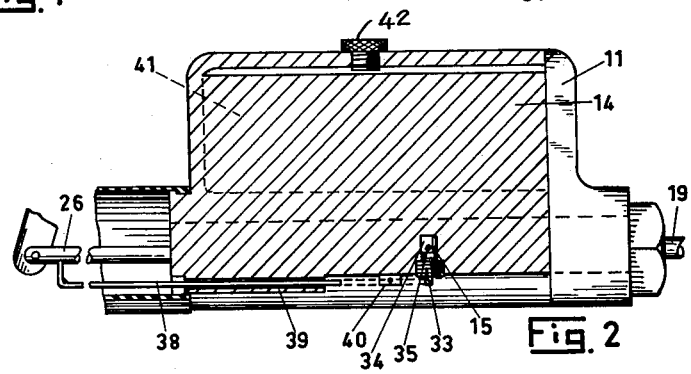
FIG. 2 is a longitudinal, mid-vertical section of the master cylinder as illustrated in FIG. 1, taken on the line 2—2, showing in particular the equalizing port and emergency cut-off mechanism.
Figures 3, 4:
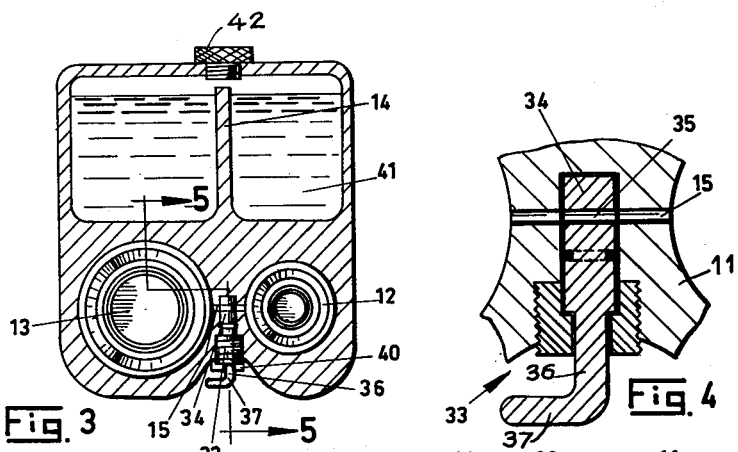
FIG. 3 is a transverse section of the invention as illustrated in FIG. 1, taken on the line 3—3 and illustrating in particular, the operating rod and emergency cut-out mechanism.
FIG. 4 is an enlarged fragmentary mid-vertical, transverse, sectional elevation taken on the line 3—3 in FIG. 1 showing the emergency cut-out mechanism.
Figure 5:
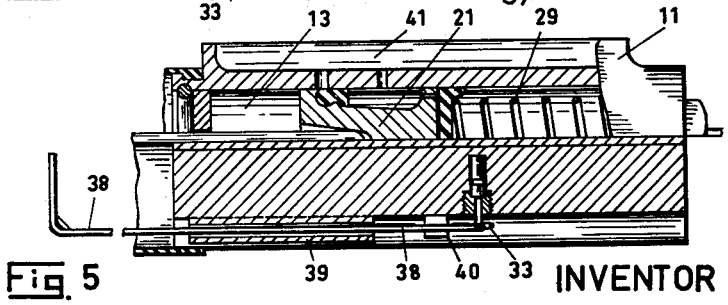
FIG. 5 is a part sectional side elevation taken on the line 5—5 of FIG. 3.

Referring to FIGS. 1, 2 and 3, the assembly and operation of a safety cut-off valve assembly 33 is illustrated comprising a barrel valve 34 sealably, rotatably located transversely through port 15. A hole 35 is formed diametrically through barrel valve 34 substantially centrally and is adapted to lie in axial alignment with port 15, thereby permitting fluid 32 to flow therethrough. An operating rod 36 extends outwardly from barrel valve 34 through housing 11, being rotatably retained therein, to terminate in an operating lever 37 adapted to lie substantially in parallel spaced apart relationship with the outer surface of housing 11. In this manner, arcuate movement of lever 37 rotates rod 36 and causes barrel valve 34 to rotate within port 15. Rotatably relocating hole 35 will cause barrel valve 34 to blank off port 15 and prevent fluid flow between spaces 30 and 31 of cylinders 12 and 13 respectively.

In normal operation, lever 37 is so positioned that hole 35 is in axial alignment with port 15 as previously described and spaces 30 and 31 are interconnected.

A rod 38 is rigidly interconnected with bar 26 and slidably supported through a bushing assembly 39 located on housing 11 to reciprocate in unison with pistons 20 and 21. Under normal operating conditions rod 38 is adapted to remain spaced apart from operating lever 37 of cut-off valve assembly 33. Upon pistons 20 and 21 exceeding their normal operating stroke however, rod 38 is adapted to strike operating lever 37 and thereby rotate barrel valve 34, thereby isolating spaces 30 and 31 one from the other.

Any suitable limit-switch such as a microswitch 40 is located on the outer surface of housing 11 and, upon lever 37 of safety cut-off valve assembly 33 moving into its emergency position as herein described, microswitch 40 is arranged to be actuated in conventional manner as by contact with lever 37 or rod 38, to operate any conventional electrical warning system.

Referring to FIGS. 1, 2, 3, 4 and 5, the operation of master cylinder 10 under normal conditions is carried out by spaces 30 and 31 of cylinders 12 and 13 respectively being filled with fluid 32 and barrel valve 34 being located in a position in which hole 35 therethrough is axially aligned with port 15 so that, upon application of brakes, a uniform pressure is developed throughout the entire braking system through pipe lines 18 and 19. In this manner, an even braking pressure is applied to all brake units and, furthermore, a standard method of adjustment may be utilized as with a normal system.

By way of example, a break in pipe line 18 will permit fluid 32 to escape therefrom, and it will be noted, that the initial movement of pistons 20 and 21 after the leak in pipe 18 developing is similar to that of normal operation, hole 35 in barrel valve 34 still being in axial alignment with port 15, thereby permitting fluid 32 to escape initially through hole 35 from space 31 into space 30. Hole 35, however, is of sufficiently small dimension to provide that this initial leak from space 31 is substantially negligible. Due to the fluid loss from spaces 30 and 31, pistons 20 and 21 may thereafter move further into cylinders 12 and 13 respectively and it will be noted that this movement results in rod 38 contacting lever 37 thus causing barrel valve 34 to rotate, blanking off port 15 as previously described and operating the warning system through microswitch 40, also previously described.

As in normal operation, pistons 20 and 21 will be returned to their normal retracted positions under the influence of springs 28 and 29 and, in this instance, additional fluid from the pertinent reservoir is drawn into space 31 so that space 31 is fully charged with fluid 32 for subsequent operations of master cylinder 10 after leak having developed. It should be noted, however, that in this instance only cylinder 13 is now operable and, through pipe line 19, the front brakes only are applied. This is intended purely as a safety measure and not as a substitute for a full braking procedure and, it should be pointed out, to this end, that the warning triggered by lever 37 and effected by microswitch 40 remains in operation until the defective portion of the braking system is repaired and lever 37 moved arcuately manually to its normal operating position.

As an added safety precaution, a conventional reservoir 41 is divided substantially centrally by a partition 14 adapted to prevent total loss of fluid 32 from reservoir 41 upon cylinder 12 or 13 losing its fluid as previously described.

It should also be noted that both sides of reservoir 41 are supplied by a common filler plug assembly 42, thereby minimizing the danger of contamination during the filling and topping up process.

The general design of the individual parts of the invention as explained above may be varied according to requirements in regards to manufacture and production thereof, while still remaining within the spirit and principle of the invention, without prejudicing the novelty thereof.

The embodiments of the invention in which an exclusive property or privilege is claimed are defined as follows:

1. A master cylinder assembly including a plurality of juxtaposed, fluid-tight cylinders interconnected by port means, a plurality of pistons slidably operable within said cylinders, pipe means connected with each of said cylinders for the purpose of ducting fluid thereto and therefrom; manually resettable valve means adapted to close said port means in response to overtravel of said pistons during an operating stroke thereof, and operating means moving said pistons in unison within said cylinders.

2. A master cylinder assembly as defined in claim 1 in which said valve means comprises a barrel valve having a hole formed therethrough, said barrel valve being selectively rotatable within said port means causing said hole to be in axial alignment with said port means in a first position of said barrel valve and to be completely out of communication therewith upon said barrel valve assuming a second position.

3. A master cylinder assembly as defined in claim 1 including an automatically actuated warning device mounted upon said master cylinder, rod means integral with said piston operating means, guide means cooperating with said rod means slidably locating said rod means in linear alignment with said warning device.

4. A master cylinder assembly as defined in claim 1 including an automatically actuated warning device mounted upon said master cylinder, rod means integral with said piston operating means, guide means cooperating with said rod means slidably locating said rod means in linear alignment with said warning device, lever means simultaneously operable by said rod means causing said barrel valve to assume said second position.

5. A master cylinder assembly as defined in claim 2 including an automatically actuated warning device mounted upon said master cylinder, rod means integral with said piston operating means, guide means cooperating with said rod means slidably locating said rod means in linear alignment with said warning device.

6. A master cylinder assembly as defined in claim 2 including an automatically actuated warning device mounted upon said master cylinder, rod means integral with said piston operating means, guide means cooperating with said rod means slidably locating said rod means in linear alignment with said warning device, lever means simultaneously operable by said rod means causing said barrel valve to assume said second position.

References Cited in the file of this patent

UNITED STATES PATENTS

| | | |
|---|---|---|
| 1,557,330 | Reynolds | Oct. 13, 1925 |
| 1,707,781 | Blanchard | Apr. 2, 1929 |
| 2,074,730 | Kerr | Mar. 23, 1937 |
| 2,609,067 | Blafield | Sept. 2, 1952 |